US012081280B2

(12) United States Patent
Yang et al.

(10) Patent No.: US 12,081,280 B2
(45) Date of Patent: Sep. 3, 2024

(54) RADIO FREQUENCY HIGH-SPEED SWITCHING CONTROL CIRCUIT AND DEVICE

(71) Applicant: Zhejiang Ocean University, Zhoushan (CN)

(72) Inventors: Kun Yang, Zhoushan (CN); Shefeng Yan, Zhoushan (CN); Xuyang Chen, Zhoushan (CN); Xianzhong Xu, Zhoushan (CN)

(73) Assignee: Zhejiang Ocean University, Zhoushan (CN)

( * ) Notice: Subject to any disclaimer, the term of this patent is extended or adjusted under 35 U.S.C. 154(b) by 0 days.

(21) Appl. No.: 18/637,424

(22) Filed: Apr. 16, 2024

(65) Prior Publication Data
US 2024/0267137 A1  Aug. 8, 2024

Related U.S. Application Data

(63) Continuation of application No. PCT/CN2022/119190, filed on Sep. 16, 2022.

(30) Foreign Application Priority Data

Dec. 20, 2021 (CN) .......................... 202111562453.X

(51) Int. Cl.
*H04B 17/20* (2015.01)
(52) U.S. Cl.
CPC .................................... *H04B 17/25* (2023.05)
(58) Field of Classification Search
CPC . H04B 1/40; H04B 1/006; H04B 1/44; H04B 1/0458; H04B 1/18; H04B 1/48;
(Continued)

(56) References Cited

U.S. PATENT DOCUMENTS

2005/0139286 A1\* 6/2005 Poulter ................... B67D 7/36
141/234
2006/0132287 A1   6/2006 Phipps et al.
(Continued)

FOREIGN PATENT DOCUMENTS

CN          203933588 U      11/2014
CN          203982394 U      12/2014
(Continued)

OTHER PUBLICATIONS

Internation Search Report of PCT/CN2022/119190, Mailed Nov. 25, 2022.

*Primary Examiner* — Ajibola A Akinyemi
(74) *Attorney, Agent, or Firm* — True Shepherd LLC; Andrew C. Cheng

(57) ABSTRACT

A radio frequency high-speed switching control circuit comprises: a control module, outputting a control signal according to a preset algorithm; and a switching module, connected with the control module, and switching an input radio frequency signal to different radio frequency signal output ports for outputting according to the control signal output by the control module; wherein a plurality of toggle switch chips are provided in the switching module, and the toggle switch chips are electrically connected in a cascading manner. The advantages of the present disclosure lie in that through the design of a byte logic control circuit, toggle switches are cascaded to achieve that one input signal is switched to sixteen signal outputs (SPT16) and radio frequency signals within a frequency band range of 5 MHz to 6 GHz can be covered.

5 Claims, 5 Drawing Sheets

(58) Field of Classification Search
CPC ...... H04B 7/0617; H04B 1/0475; H04B 1/04; H04B 2001/0408; H04B 7/0695; H04B 1/38; H04B 1/0057; H04B 1/525; H04B 1/401; H04B 1/00; H04B 7/0626; H04B 17/318; H04B 7/0408; H04B 2001/0416; H04B 7/088; H04B 1/005
USPC .......................................................... 455/62
See application file for complete search history.

(56) References Cited

U.S. PATENT DOCUMENTS

| | | | |
|---|---|---|---|
| 2012/0099873 A1* | 4/2012 | Ninomiya ........ | G03G 15/04036 399/15 |
| 2015/0305595 A1 | 10/2015 | Khait et al. | |
| 2015/0372522 A1* | 12/2015 | Park .......................... | H02J 7/02 307/21 |
| 2020/0176862 A1 | 6/2020 | Chen et al. | |

FOREIGN PATENT DOCUMENTS

| CN | 109039350 A | 12/2018 |
|---|---|---|
| CN | 114050879 A | 2/2022 |

\* cited by examiner

| CTRL[3..0]: | | | | |
|---|---|---|---|---|
| U1 | U2-5 | Bin: | Hex: | Channel |
| 10 | 10 | 1010 | 0xA | 0 |
| 10 | 01 | 1001 | 0x9 | 1 |
| 10 | 11 | 1011 | 0xB | 2 |
| 10 | 00 | 1000 | 0x8 | 3 |
| 01 | 10 | 0110 | 0x6 | 4 |
| 01 | 01 | 0101 | 0x5 | 5 |
| 01 | 11 | 0111 | 0x7 | 6 |
| 01 | 00 | 0100 | 0x4 | 7 |
| 11 | 10 | 1110 | 0xE | 8 |
| 11 | 01 | 1101 | 0xD | 9 |
| 11 | 11 | 1111 | 0xF | 10 |
| 11 | 00 | 1100 | 0xC | 11 |
| 00 | 10 | 0010 | 0x2 | 12 |
| 00 | 01 | 0001 | 0x1 | 13 |
| 00 | 11 | 0011 | 0x3 | 14 |
| 00 | 00 | 0000 | 0x0 | 15 |

FIG. 4

RADIO FREQUENCY HIGH-SPEED SWITCHING CONTROL CIRCUIT AND DEVICE

CROSS-REFERENCE TO RELATED APPLICATIONS

This application is a continuation of International Patent Application No. PCT/CN2022/119190 with a filing date of Sep. 16, 2022, designating the United States, now pending, and further claims priority to Chinese Patent Application No. 202111562453.X with a filing date of Nov. 20, 2021. The content of the aforementioned application, including any intervening amendments thereto, is incorporated herein by reference.

TECHNICAL FIELD

The present disclosure relates to the technical field of radio frequency communication, and in particular to a radio frequency high-speed switching control circuit and a radio frequency high-speed switching device.

BACKGROUND ART

Wireless channel characteristics are presented differently in different communication environments, so they are very necessary and crucial to channel measurement and modeling in different environments. A high-precision wireless channel measurement instrument needs to be designed to accurately extract the above channel information and construct a reasonable channel model.

For the high-precision wireless channel measurement instrument focused on sub-channel radio frequency switching, its main principle is to only monitor a sub-channel comprising one transmitting-end antenna and one receiving-end antenna every time and switching the measured multi-antenna sub-channels in a short time through the radio frequency high-speed switching technology, thereby completing a measurement process of large-scale antenna channels. In this way, it can be ensured that signals go through the same circuit on a receiver, reducing influences caused by circuit differences, so it is critical to designing an electronic radio frequency high-speed switcher.

Electronic radio frequency high-speed switchers in current domestic and foreign markets are mainly within SPT8, the maximum number of supported switching ports is eight, and input power is mainly within 26 dBm. For a 128-channel large-scale antenna array, its cascading structure will reach 3 layers, and its consumption and system structure performance will be affected greatly, so it is very necessary to design the electronic radio frequency high-speed switcher that supports more output ports.

SUMMARY OF THE PRESENT INVENTION

An object of the present disclosure is to provide a radio frequency high-speed switching control circuit and a radio frequency high-speed switching device, so as to solve the problem of multiport output and control in a radio frequency switcher;

to achieve the above object, the following technical solution is adopted in the present disclosure:
a radio frequency high-speed switching control circuit, comprising:
a control module, outputting a control signal according to a preset algorithm; and
a switching module, connected with the control module, and switching an input radio frequency signal to different radio frequency signal output ports for outputting according to the control signal output by the control module; wherein
a plurality of toggle switch chips are provided in the switching module, and the toggle switch chips are electrically connected in a cascading manner.

Further, a twenty-second pin of a first toggle switch chip is a first-stage radio frequency signal input port; a fifth pin, an eighth pin, an eleventh pin and a fourteenth pin of the first toggle switch chip are radio frequency signal output ports of a first-stage toggle switch chip; the pins are connected with a radio frequency signal input port of a second-stage toggle switch chip, respectively; and a fifth pin, an eighth pin, an eleventh pin and a fourteenth pin of each second-stage toggle switch chip are radio frequency signal output ports of the second-stage toggle switch chip.

Further, a seventeenth pin and an eighteenth pin of each toggle switch chip are connected with the control module.

Further, a model of the toggle switch chip is QPC6044SQ.

Further, a control chip is provided in the control module, and the control chip outputs the control signal according to the preset algorithm.

Further, a model of the control chip is ATXMEGA32A4-AU.

The present disclosure further provides a radio frequency high-speed switching device, comprising a circuit board, wherein a switching module is provided on the circuit board, and one radio frequency signal input port, sixteen radio frequency signal output ports and a network interface electrically connected with the switching module are provided on an edge of the circuit board.

Further, the switching module comprises a first toggle switch chip and a second-stage toggle switch chip cascaded with the first toggle switch chip; the first toggle switch chip is provided in the center of the circuit board, and the first toggle switch chip is connected with the radio frequency signal input port; and the second-stage toggle switch chip is provided at an outside of the first toggle switch chip, and the second-stage toggle switch chip is connected with the sixteen radio frequency signal output ports, respectively.

Further, the circuit board is arranged in an octagonal shape.

Compared with the prior art, the present disclosure at least includes the following beneficial effects:

(1) through the design of a byte logic control circuit, toggle switches are cascaded to achieve that one input signal is switched to sixteen signal outputs (SPT16) and radio frequency signals within a frequency band range of 5 MHz to 6 GHz can be covered;

(2) an RJ45 standard interface is used on the radio frequency high-speed switching device to perform power supply and logic control on the toggle switch chip and the control chip on the circuit board, and a plurality of switching devices can be connected in series through an RJ45 network cable to perform united power supply and restricted use; and (3) an octagonal interface is used for layout design, and the input port and the output port of radio frequency signals and the RJ45 network interface are arranged on each edge of the octagonal interface, so that wiring is more convenient.

BRIEF DESCRIPTION OF THE DRAWINGS

FIG. 4 is a schematic diagram of logic codes of a toggle switch in Embodiment 1 of the present disclosure.

Figure 1:
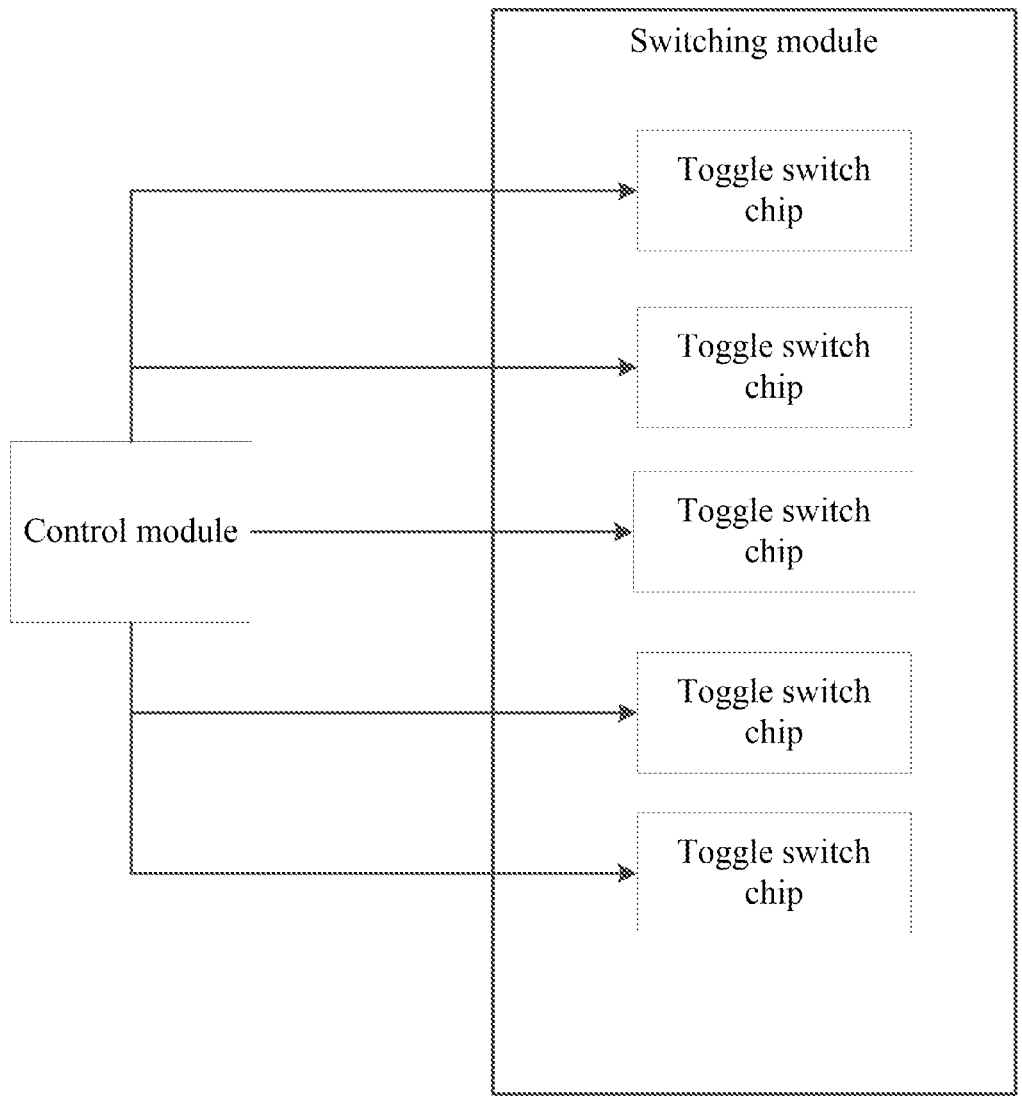
FIG. 1 is a schematic frame diagram of a control circuit in Embodiment 1 of the present disclosure.

In the drawings, 1. circuit board, 11. radio frequency signal input port, 12. radio frequency signal output port, 13. toggle switch chip, 14. network interface, 15. first switch, 16. second switch.

DESCRIPTION OF EMBODIMENTS

It shall be noted that the description of the present disclosure involving "first", "second", "one", etc. is only for the purpose of description, but cannot be construed as indicating or implying relative importance or implicitly indicating the number of technical features indicated. Therefore, the features defined by "first" and "second" may explicitly or implicitly include at least one of the features. In the description of the present disclosure, the meaning of "a plurality of" is at least two, for example, two, three, etc., unless otherwise expressly and specifically defined.

In the present disclosure, unless otherwise expressly specified and defined, the terms "connection", "fixation", etc. shall be understood broadly, for example, the "fixation" may be fixed connection or detachable connection, or connection as a whole; it may be mechanical connection or electrical connection; it may be direct connection, or indirect connection through an intermediate medium, or communication within two elements or interaction between two elements, unless otherwise expressly defined. For those of ordinary skill in the art, specific meanings of the above terms in the present disclosure may be understood according to specific circumstances.

In addition, the technical solutions between various embodiments of the present disclosure may be combined with each other, but must be based on that the combination of technical solutions can be implemented by those of ordinary skill in the art; in case that the combination of technical solutions contradicts each other or cannot be implemented, it shall be deemed that the combination of technical solutions does not exist, and is not within the protection scope claimed by the present disclosure.

The following are specific embodiments of the present disclosure, and the technical solutions of the present disclosure are further described in combination with the drawings, but the present disclosure is not limited to these embodiments.

Embodiment 1

Figure 2:
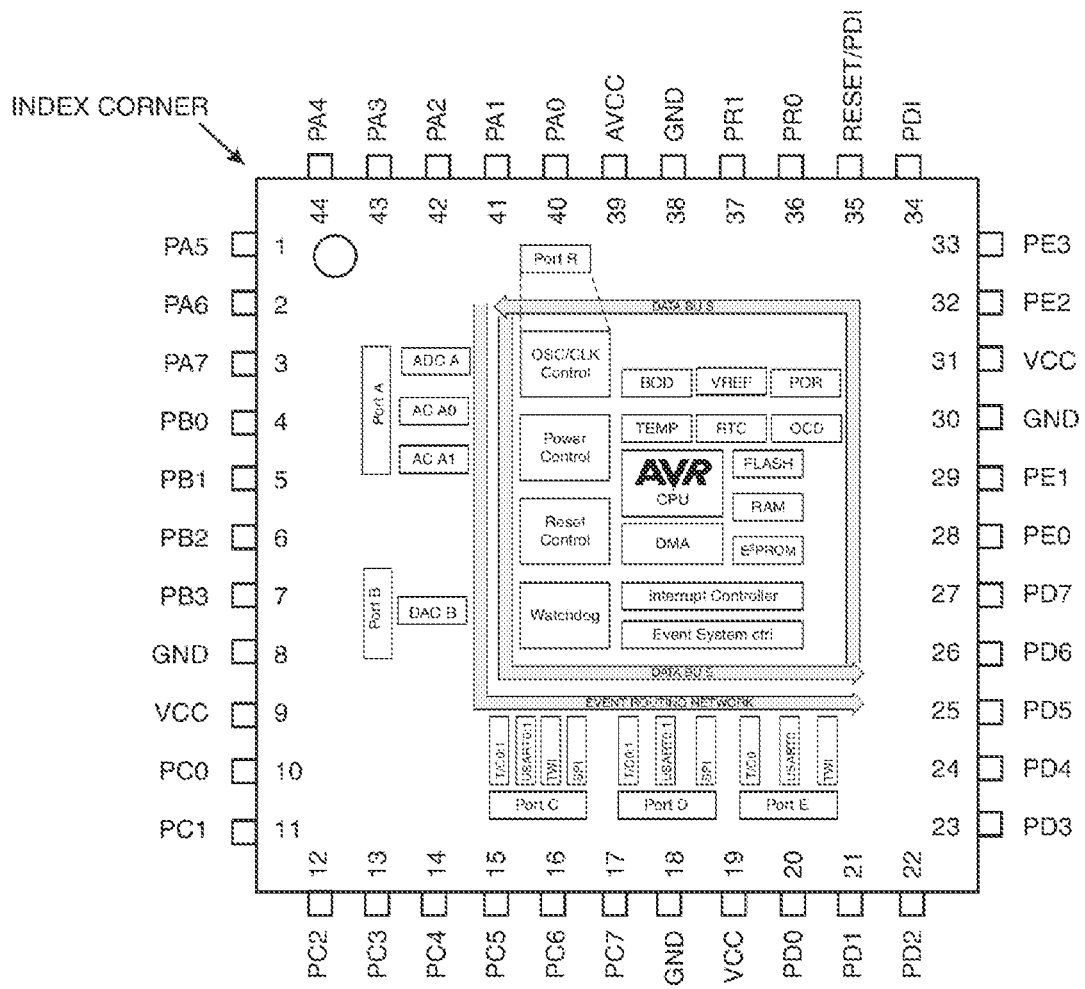
FIG. 2 is a pin diagram of a control chip in Embodiment 1 of the present disclosure.

As shown in FIG. 1, a radio frequency high-speed switching control circuit according to the present disclosure comprises: a control module and a switching module. A plurality of toggle switch chips are provided in the switching module, the toggle switch chips are electrically connected in a cascading manner, and a model of the toggle switch chip is QPC6044SQ. A control chip is provided in the control module, a model of the control chip is ATXMEGA32A4-AU, and its pin distribution is shown in FIG. 2. An I/O port is selected from the pins and connected with each toggle switch chip, which can send preset code information to each toggle switch chip.

Figure 3:
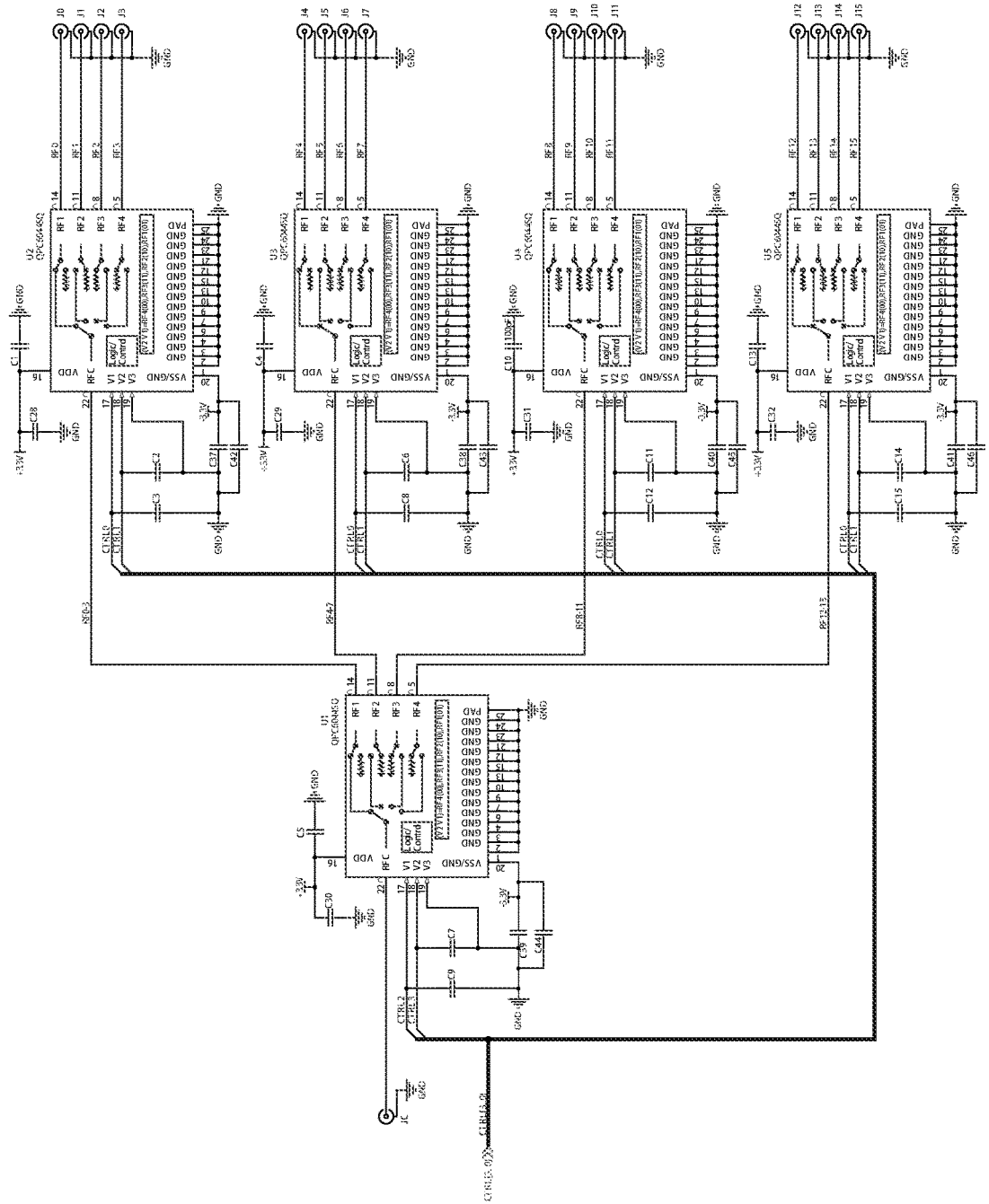
FIG. 3 is a circuit diagram of a switching module in Embodiment 1 of the present disclosure.
Figure 5:
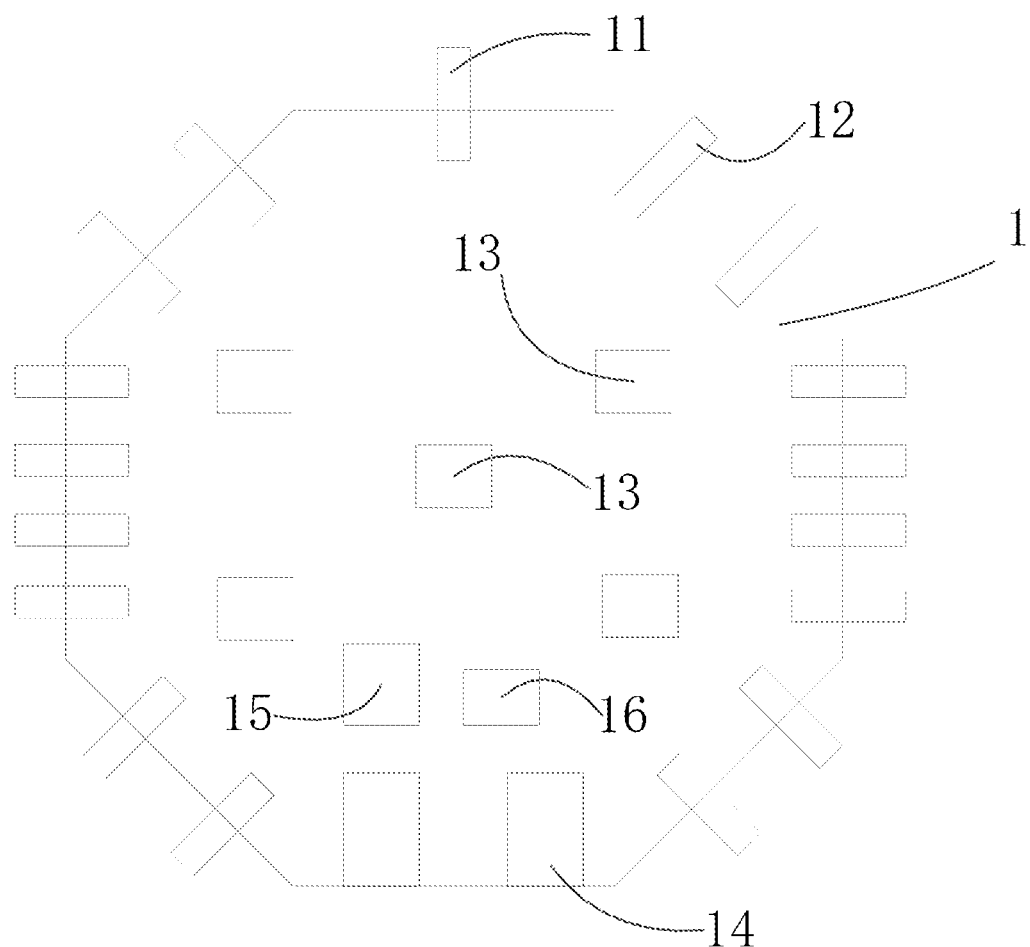
FIG. 5 is a structural schematic diagram of a switching device in Embodiment 2 of the present disclosure.

As shown in FIG. 3, specifically, a twenty-second pin of a first toggle switch chip U1 is a first-stage radio frequency signal input port; a fifth pin, an eighth pin, an eleventh pin and a fourteenth pin of the first toggle switch chip U1 are radio frequency signal output ports of a first-stage toggle switch chip; and the above pins are connected with a radio frequency signal input port of a second-stage toggle switch chip, respectively, that is, twenty-second pins of the toggle switch chips U2-U5 and a fifth pin, an eighth pin, an eleventh pin and a fourteenth pin of second-stage toggle switch chips U2-U5 are radio frequency signal output ports of the second-stage toggle switch chip. A seventeenth pin and an eighteenth pin of the toggle switch chips U1-U5 are connected with the control chip.

As shown in FIG. 4, the code information is sent to each toggle switch chip according to set logic codes, and each toggle switch chip is used to switch an input radio frequency signal to different radio frequency signal output ports for outputting.

When a circuit starts to run, that is, the twenty-second pin (an RFC pin) receives an input signal, the first toggle switch chip U1 starts to work and receives a signal from the control chip, and sets V2 and V3 to 0 and V1 to 1. At this time, according to the logic codes in FIG. 4, the fourteenth pin (an RF1 pin) is connected, and meanwhile the toggle switch chip U2 connected with the fourteenth pin of the first toggle switch chip U1 is connected. When the twenty-second pin (the RFC pin) of the toggle switch chip U2 receives the signal, V1, V2 and V3 of the toggle switch chip U2 receive the signal from the control chip, code information of V1, V2 and V3 is used for successively achieving the connection of the fifth pin, the eighth pin, the eleventh pin and the fourteenth pin (RF1-RF4 pins) according to code rules. Similarly, the code information is changed so that the fifth pin, the eighth pin, the eleventh pin and the fourteenth pin (RF1-RF4 pins) of the toggle switch chips U3-U5 are successively connected until 16 channels are connected once, that is, one round of signal output is completed.

According to the present disclosure, through the design of a byte logic control circuit, toggle switches are cascaded to achieve that one input signal is switched to sixteen signal outputs (SPT16) and radio frequency signals within a frequency band range of 5 MHz to 6 GHz can be covered.

Embodiment 2

A radio frequency high-speed switching device according to the present disclosure comprises a circuit board 1, wherein the circuit board 1 is arranged in an octagonal shape. One radio frequency signal input port 11, sixteen radio frequency signal output ports 12 and a network interface 14 are provided on an edge of the circuit board 1.

One toggle switch chip 13 is provided in the center of the circuit board 1, the toggle switch chip provided in the center is the first toggle switch chip U1 (that is, the first-stage toggle switch chip), and the first toggle switch chip U1 is connected with the radio frequency signal input port 11. A second-stage toggle switch chip 13 is provided at an outside of the first toggle switch chip U1, and the second-stage toggle switch chips 13 (that is, the toggle switch chips U2-U5) are connected with the sixteen radio frequency signal output ports 12, respectively.

The network interface 14 on the circuit board connects the toggle switch chip with the control chip through an RJ45 standard network cable, so that the toggle switch chip can receive a logic control signal sent by the control chip.

The logic control signal sent by the control chip is transmitted through a 5V differential signal level, to ensure interference immunity. The network cable uses Ethernet cable standards that are consistent with the use of an RJ45 connector, so that all multiplexers receive the same configuration bytes simultaneously. Therefore, a plurality of switching devices can be connected together through the RJ45 network cable in any order, to implement radio frequency signal output of 128 channels.

A corresponding first switch 15 and a second switch 16 are also provided on the circuit board, and the first switch 15 is a selector switch, which can select a corresponding channel manually according to the logic codes shown in FIG. 4, that is, the channel is selected manually. The second switch 16 is used for cascading the plurality of switching devices, and when it is required to implement 128-channel switching, the plurality of switching devices need to be cascaded, and the second switch 16 in the stage of switching devices needs to be turned on when next stage of switching devices need to be connected, so that the switching device can input the radio frequency signal to the next stage of switching devices.

According to the present disclosure, an octagonal interface is used for layout design, and the input port and the output port of radio frequency signals and the RJ45 network interface are arranged on each edge of the octagonal interface, so that wiring is more convenient.

In addition, the RJ45 standard interface is used on the radio frequency high-speed switching device to perform power supply on the toggle switch chip on the circuit board and perform logic control between the control chips, and the plurality of switching devices are connected in series through the RJ45 network cable to perform united power supply and restricted use.

Specific embodiments described herein are only illustrative of the spirit of the present disclosure. Those skilled in the art of the present disclosure can make various modifications or additions to the specific embodiments described or replace them in a similar manner, without deviating from the spirit of the present disclosure or going beyond the scope defined in the attached claims.

What is claimed is:

1. A radio frequency high-speed switching device, comprising a circuit board in an octagonal layout, wherein a radio frequency high-speed switching control circuit is provided on the circuit board, and the radio frequency high-speed switching control circuit comprises:
   a control module, wherein a control chip is provided in the control module, and the control chip outputs a control signal according to a preset algorithm; and
   a switching module, connected with the control module, and switching an input radio frequency signal to different radio frequency signal output ports for outputting according to the control signal output by the control module; wherein
   one radio frequency signal input port, sixteen radio frequency signal output ports and a network interface electrically connected with the switching module are provided on an edge of the circuit board;
   a plurality of toggle switch chips are provided in the switching module, and the toggle switch chips are electrically connected in a cascading manner; the switching module comprises a first toggle switch chip and a second-stage toggle switch chip cascaded with the first toggle switch chip; the first toggle switch chip is provided in the center of the circuit board, and the first toggle switch chip is connected with the radio frequency signal input port; and the second-stage toggle switch chip is provided at an outside of the first toggle switch chip, and the second-stage toggle switch chip is connected with the sixteen radio frequency signal output ports, respectively;
   a second switch is further provided on the circuit board, and when the second switch is turned on, a plurality of radio frequency high-speed switching devices can also form a cascaded structure; and
   the network interface connects the toggle switch chip with the control chip through an RJ45 standard network cable.

2. The radio frequency high-speed switching device according to claim 1, wherein a twenty-second pin of the first toggle switch chip is a first-stage radio frequency signal input port; a fifth pin, an eighth pin, an eleventh pin and a fourteenth pin of the first toggle switch chip are radio frequency signal output ports of the first toggle switch chip; the pins are connected with a radio frequency signal input port of the second-stage toggle switch chip, respectively; and a fifth pin, an eighth pin, an eleventh pin and a fourteenth pin of each second-stage toggle switch chip are radio frequency signal output ports of the second-stage toggle switch chip.

3. The radio frequency high-speed switching device according to claim 2, wherein a seventeenth pin and an eighteenth pin of each toggle switch chip are connected with the control module.

4. The radio frequency high-speed switching device according to claim 1, wherein a model of the toggle switch chip is QPC6044SQ.

5. The radio frequency high-speed switching device according to claim 1, wherein a model of the control chip is ATXMEGA32A4-AU.

* * * * *